(12) United States Patent
Palmgren et al.

(10) Patent No.: US 8,377,158 B2
(45) Date of Patent: Feb. 19, 2013

(54) EXTENDED LIFE ABRASIVE ARTICLE AND METHOD

(75) Inventors: Gary M. Palmgren, Lake Elmo, MN (US); Jay B. Preston, Woodbury, MN (US); Brian D. Goers, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 957 days.

(21) Appl. No.: 11/837,774

(22) Filed: Aug. 13, 2007

(65) Prior Publication Data

US 2008/0053000 A1    Mar. 6, 2008

Related U.S. Application Data

(60) Provisional application No. 60/824,048, filed on Aug. 30, 2006.

(51) Int. Cl.
*B24D 3/00* (2006.01)
(52) U.S. Cl. ............... 51/297; 51/295; 51/307; 51/308; 51/293
(58) Field of Classification Search ............ 51/297, 51/295, 307; 451/443, 285
See application file for complete search history.

(56) References Cited

U.S. PATENT DOCUMENTS

| | | | | |
|---|---|---|---|---|
| 3,675,311 A * | 7/1972 | Wells | | 228/194 |
| 4,029,479 A * | 6/1977 | Parker | | 428/660 |
| 5,049,165 A | 9/1991 | Tselesin | | |
| 5,234,152 A * | 8/1993 | Glaeser | | 228/121 |
| 6,123,612 A * | 9/2000 | Goers | | 451/540 |
| 6,309,433 B1 | 10/2001 | Kinoshita | | |
| 6,537,140 B1 * | 3/2003 | Miller et al. | | 451/259 |
| 6,669,745 B2 * | 12/2003 | Prichard et al. | | 51/297 |
| 6,884,155 B2 * | 4/2005 | Sung et al. | | 451/443 |
| 2003/0080177 A1 * | 5/2003 | Yamazaki et al. | | 228/122.1 |
| 2004/0109978 A1 | 6/2004 | Michel | | |
| 2004/0112359 A1 * | 6/2004 | Sung | | 125/15 |

FOREIGN PATENT DOCUMENTS

| | | |
|---|---|---|
| JP | 1-97570 | 4/1989 |
| JP | 03-234472 | 1/1992 |
| JP | 04-129660 | 4/1992 |
| JP | 4-506634 | 11/1992 |
| JP | 2002-209912 | 7/2002 |
| JP | 2006-501073 | 1/2006 |
| WO | 91/10538 | 7/1991 |
| WO | 2004/028746 | 4/2004 |

OTHER PUBLICATIONS

A Study of the Transient Liquid Phase bonding process applied to a Ag/Cu/Ag Sanwich Joint by Isaac Tuah-Poku et al. Metallurgical Transactions. vol. 19A, Mar. 1988, p. 675.*
A study of the Transient Liquid Phase Bonding Process Applied to a Ag/Cu/Ag sandwich joint.Metallufical Transactions. Mar. 1998. By Tuah-Poku et al.*
MacDonald et al., "Transient Liquid Phase Bonding Processes", The Metal Science of Joining, The Minerals, Metals & Materials Society, 1992.

* cited by examiner

*Primary Examiner* — Melvin C Mayes
*Assistant Examiner* — Colette Nguyen
(74) *Attorney, Agent, or Firm* — Dean M. Harts; Ann K. Gallagher

(57) ABSTRACT

Provided is an abrasive article comprising (a) a metallic foil having a first and second surfaces and voids therebetween, (b) a plurality of abrasive particles substantially in the voids, and (c) an alloy at least partially between the abrasive particles and the foil in the voids, wherein the alloy comprises a second component and a portion of the metallic foil near the voids. Also provided are methods of making and using such abrasive articles.

20 Claims, 1 Drawing Sheet

EXTENDED LIFE ABRASIVE ARTICLE AND METHOD

CROSS REFERENCE TO RELATED APPLICATION

This application claims the benefit of U.S. Provisional Patent Application No. 60/824,048, filed Aug. 30, 2006, the disclosure of which is incorporated by reference herein in its entirety.

TECHNICAL FIELD

This invention relates to abrasive articles useful, for example, in chemical-mechanical planarization (CMP) or saw blades. The invention also relates to methods of making and using such abrasive articles.

BACKGROUND

During integrated circuit device manufacturing, silicon wafers used in semiconductor fabrication undergo numerous processing steps, including deposition, patterning, and etching. With each step, it is often necessary or desirable to modify or refine an exposed surface of the wafer to prepare it wafer for subsequent manufacturing steps. For example, semiconductor wafers having shallow trench isolation structures require planarization of the dielectric material before further processing.

One method of modifying exposed surfaces of such wafers uses a process that treats a wafer surface with a planarization or polishing slurry with a plurality of loose abrasive particles dispersed in a liquid. Typically this slurry is applied to a polishing pad and the wafer surface is then polished against the pad to remove material from the wafer surface. Generally, the slurry also contains agents that react with the wafer surface and/or the abraded material. This type of process is commonly referred to as a chemical-mechanical polishing (CMP) process. The surface of the polishing pad periodically must be dressed or conditioned, usually with an abrasive article called a pad conditioner, which typically has an abrasive or superabrasive surface. Such abrasive articles dress the polishing pad surface, and must withstand the chemical and processing conditions while retaining the abrasive in the article.

SUMMARY

Briefly, the present invention provides an abrasive article comprising (a) a metallic foil having a first and second surfaces and voids therebetween, (b) a plurality of abrasive particles substantially in the voids, and (c) an alloy at least partially between the abrasive particles and the foil in the voids, wherein the alloy comprises a second component and a portion of the metallic foil near the voids.

In another aspect, the present invention provides a method of making an abrasive article comprising (a) providing a metallic foil having first and second surfaces and voids therebetween, (b) providing abrasive particles substantially in the voids of the metallic foil, (c) providing a second component adjacent to the foil, (d) heating at least the metallic foil and the second component to a temperature sufficient to provide an alloy of the metallic foil and the second component.

It is an advantage of certain embodiments of the present invention to provide abrasive articles, such as saw blades and pad conditioners, which have extended life. In some embodiments, the abrasive articles of the present invention have 50% or even longer life than otherwise comparable known abrasive articles.

Other features and advantages of the invention will be apparent from the following detailed description and the claims. The above summary of principles of the disclosure is not intended to describe each illustrated embodiment or every implementation of the present disclosure. The figures and the detailed description that follow more particularly exemplify certain preferred embodiments using the principles disclosed herein.

DETAILED DESCRIPTION OF PRESENTLY PREFERRED EMBODIMENTS

Figure 1:
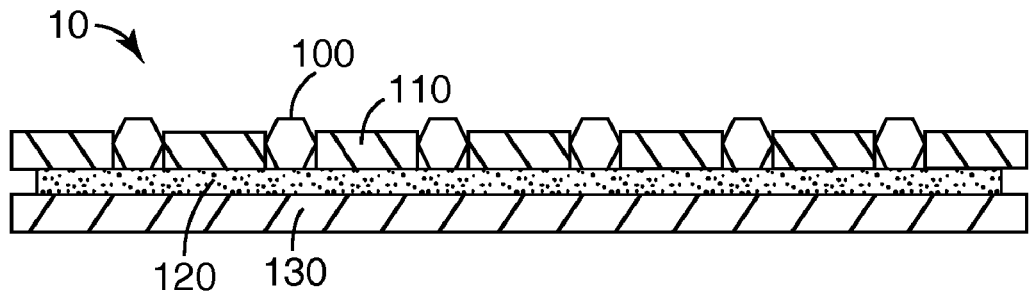
FIG. 1 is a schematic cross-section of an intermediate in the manufacture of an abrasive article of an embodiment of the invention.

All numbers are herein assumed to be modified by the term "about." The recitation of numerical ranges by endpoints includes all numbers subsumed within that range (e.g., 1 to 5 includes 1, 1.5, 2, 2.75, 3, 3.80, 4, and 5).

In one embodiment, the present invention provides an abrasive article comprising (a) a metallic foil having first and second surfaces and voids therebetween, (b) a plurality of abrasive particles substantially in the voids, and (c) an alloy at least partially between the abrasive particles and the foil in the voids, wherein the alloy comprises a second component and a portion of the metallic foil near the voids.

In another embodiment, the present invention provides a method of making an abrasive article comprising (a) providing a metallic foil having first and second surfaces and voids therebetween, (b) providing abrasive particles substantially in the voids of the metallic foil, (c) providing a second component adjacent to the foil, (d) heating at least the metallic foil and the second component to a temperature sufficient to provide an alloy of the metallic foil and the second component.

Thus, the invention relates to a class of abrasive articles and methods of preparation thereof. The articles comprise abrasive or superabrasive particles, held by a melt processed alloy, and in some embodiments in a non-random pattern. In one embodiment, a sheet of metallic foil is used. This foil may contain blind holes or through holes (perforated). Generally, the foil forms a component of a metal alloy holding the abrasive particles, and this foil forms a discrete component of the abrasive article. In one embodiment, the foil forms the majority of a contacting face of an abrasive article. In some embodiments the foil sheet has a melting temperature higher than the temperature used during a heating process. In some embodiments, the metallic foil and the second component together form an alloy. Generally, each precursor to the alloy has a melt temperature higher than the heating temperature used for a composite of their combination.

In one particular embodiment, the metallic foil is a perforated sheet of zirconium, melting point 1852° C., the second component is nickel, melting point 1453° C., and these materials are used in a heating process up to a temperature of around 1000° C. It is believed that during such processing, a zirconium/nickel eutectic melt forms and serves to anchor the abrasive particles in the voids in the metallic foil.

Other useful combinations include, among others, zirconium/cobalt, titanium/nickel, copper/silicon, and others as described herein. The resulting composite can be attached to a carrier to form, for example, a pad conditioner or a saw blade. Optionally such articles may be formed from several foil and abrasive composite layers joined by alloys formed from the alternating abrasive containing zirconium foil layers and nickel layers, or other metallic materials.

Abrasive articles, e.g., superabrasive articles, are widely used in the processing of materials. For example, applications as diverse as sawing concrete, stone, steel, or other metals, and dressing or conditioning urethane pads used for chemical mechanical planarization of semiconductor wafers. The abrasive articles of the present invention are valued for their long life and uniformity of cut rate. Since these abrasive articles are often used in harsh environments and experience high operating temperatures, they frequently are fabricated with a metal matrix or binder holding the superabrasive particles. Known abrasive articles have been fabricated using methods common in the industry such as electroplating, sintering, and brazing. In addition, methods have been employed in which the abrasive particles are randomly distributed across the surface and/or throughout the volume of the metal matrix or binder. Generally, low temperature processing, such as electroplating, produces relatively weak bonds between the abrasive particles and the metal matrix which can result in undesirably short life for the abrasive article. Similarly, processes which employ excessively high temperatures, such as brazing, can damage the abrasive particles during the heating step and also subject them to high internal stresses due to the mismatches between the coefficients of thermal expansion of the abrasive particle and the metal matrix. These weaknesses may be exacerbated by exposure to harsh acids, bases, and oxidizing chemistry in the use environment. It also has been noted that clusters of abrasive particles are often weaker than individually placed diamonds. Accordingly, it often is desirable to produce abrasive articles comprising individual superabrasive particles, e.g., diamonds, in a spaced apart configuration held by a corrosion resistant matrix fabricated at moderate thermal process conditions.

Abrasive articles of the invention may be formed using a variety of abrasive particles. In some embodiments, the abrasive particles include superabrasives such as natural or synthetic diamond, boron nitride, cubic boron nitride, silicon carbide, or combinations thereof. Suitable abrasive particles can include those coated with metal carbides or with metals that form carbides. Such coated abrasive particles can provide a stronger bond between the abrasive particles and the alloy than would be obtained in the absence of the coating.

The metallic foil may be of any convenient metal or alloy. In some embodiments, however higher melting and/or corrosion resistant metals or alloys are preferred. For example, metals such as cobalt, copper, nickel, titanium, zirconium, alloys thereof, and combinations thereof can be used. The voids can be formed as through-holes, or blind holes (indentations not as deep as the metallic foil is thick.) Indentations, adhesive, ink, electroplating, or other means may be used for holding abrasive particles in the voids at least temporarily until further processing affixes the abrasive particles more permanently in place.

Any suitable pattern of voids can be used. For example, a pattern can be a regular array or matrix, or a more random pattern. For example, a "random" or pseudorandom pattern can be used to prepare a mask such that many subsequent abrasive articles can have the same or similar "random" pattern. Such patterns can be prepared by any technique known in the art. Exemplary methods include chemical etching, electro-etching, electroforming, drilling, punching, laser cutting, and the like. The particular patterns are selected by the intended application and frequently includes square matrices, circles, annuli, arc segments, rectangles, and the like. In some embodiments, different regions of the abrasive article contains different patterns.

In some embodiments, the abrasive article described above uses abrasive particles with a selected volume, and a plurality of the abrasive particles have at least about 85% of a plurality of the abrasive particle's volume positioned between the first and second surfaces of the foil. In other embodiments, the abrasive particle volume protrusion is at least about 5%, at least about 10%, at least about 15%, or even more, above the top surface of the foil.

In other embodiments, voids can be patterned using a mechanical method such as a vacuum table with a patterned array to hold particles, and vibration to settle a particle in each void indentation. Although in some embodiments it is preferred to provide a single abrasive particle in a given void, it is also possible, or even desirable, to provide multiple abrasive particles in given voids in other embodiments.

The metal foil of the invention has a first surface and a second surface. Positioned between the first surface and the second surface are a plurality of voids which can be adapted to receive abrasive particles. The voids may be through holes, sockets, gaps, or pits. Throughout this application, the term voids will encompass both blind recesses, through holes, gaps, and combinations thereof. In some embodiments, each void will contain an abrasive particle. In some embodiments, some voids will contain one type or size of abrasive particle while other voids will contain other types or sizes of abrasive particles. In some preferred embodiments, the voids within the foil are arranged in a patterned array. In some embodiments, the voids are confined to regions of the foil to define abrasive regions of the finished abrasive article. Such regions may include, for example, the entire surface of the abrasive article, annuli, arcs, circular patches, rectangular patches, or even irregular shapes. Within a region, the voids may be arranged in rows, arcs, rectangular arrays, circles, and the like. In some embodiments, the array of voids may pseudorandom. In such pseudorandom arrays, it is preferred that individual voids be spaced apart to provide firmer support for the abrasive particles. In some embodiments, different regions will contain one type or size of abrasive particle while other regions will contain other types or sizes of abrasive particles. It will be appreciated that voids are features of the foil and may be partially or entirely filled in the finished abrasive article. In some embodiments, these metallic foil voids are filled with abrasive particles and alloy.

In some embodiments, a second component is used in combination with the above-mentioned metallic foil. This second component can be a metal or metal alloy. In some embodiments, the metallic foil and the second component are used together to form an alloy having a melting temperature or eutectic temperature below the melting point of the pure input materials. The selected metallic foil and second component together are capable of forming an alloy with at least a portion of the metal foil in the vicinity of the abrasive particles. The alloy formed thereby bonds the abrasive particles in the voids within the foil as a result of a heating process.

Simple braze processes known in the art have been used to adhere abrasive particles to a substrate, however, these typically require high temperatures that degrade the abrasive particles or lower-temperature materials that provide much less durable abrasive articles that have significantly shorter life. In contrast, the materials of various embodiments of the present invention provide extended life abrasive articles with little or no significant abrasive particle degradation. In addition, in some embodiments a composition gradient persists in the construction after the eutectic melt zone passes through the layers of the present invention, which can be observed, for example, through various known analytical techniques. In some embodiments, the second component metals or metal alloys have a melt temperature or temperatures higher than the heating or melt processing temperature and preferably form eutectics with the metal foil. One such example is the zirconium/nickel combination. Such eutectics are believed to be limited in volume by the amount of one of the metals or metal alloys present, and by the time allowed for melt processing.

In some embodiments it may be desirable to control the amount of alloy formation by selecting the relative amounts of foil and second component and/or by controlling the process conditions. If the ratio between the amount of foil and the amount of second component is controlled by providing less of the second component than would be present in a eutectic composition between the foil and the second component, alloy formation tends to be self-limiting with the excess foil remaining. If the second component is present in excess of the eutectic composition, the foil will tend to be incorporated in the alloy provided sufficient time is allowed during the heating step of the alloy formation process. Complete incorporation of the foil may be desirable in some embodiments, especially if the second component serves as a substrate for the abrasive layer or layers. Under appropriately mild heating conditions, the incorporation of the foil into the alloy will be diffusion limited leading to retention of the patterning of the abrasive particles in an alloy having a gradient of composition. In embodiments in which time and temperature of heating are controlled, it is possible to control the extent of alloy formation regardless of the ratio of foil to second component up to and including the complete incorporation of either the foil or the second component into the alloy.

The second component, e.g., a metal or metal alloy, may be provided in a number of forms without departing from the scope and spirit of the invention. For example, the second component may be provided as a foil, a powder, or a mix of powders, a preformed green body comprising metal powders and a fugitive binder, as an electrochemically deposited coating, combinations thereof, and the like. The second component may be provided in direct contact with the metallic foil and/or abrasive particles, or it may be attached by means of a fugitive material such a layer of adhesive which may be burned away during the melt processing of the assembly. In some embodiments, a patterning screen may be used instead of the foil without departing from the spirit of the invention. In those embodiments, it is generally desirable to use a larger volume of second component metal or metal alloy than would be employed with a foil. If too small a volume of second component is used, the abrasive particles may not be sufficiently firmly held in the screen.

In some embodiments, an adhesive layer is used to facilitate the assembly of the abrasive particles, metal foil, and second component. It may be advantageous to use an adhesive layer adjacent to the foil and bridging perforations in the foil to temporarily secure the abrasive particles in the apertures so that excess abrasive particles may be removed without dislodging individual abrasive particles from the apertures. The adhesive may optionally be used to secure the second metal or metal alloy component of the assembly before subsequent processing. In some embodiments, the thickness of the adhesive may be used as a template to control the protrusion of the abrasive particles through the apertures of the foil. In those embodiments, the abrasive particles are typically larger in at least one dimension than the thickness of the foil and the abrasive particles are urged into the adhesive after excess abrasive particles have been removed. Additional adhesive may then be used on the opposite surface of the foil to secure the second metal or metal alloy as a foil, powder, or powder perform. Optionally, the second metal or metal alloy may be provided directly to the metallic foil by electrochemical means, e.g., electroplating or electroless deposition, or by coating as a powder tape comprising metal powder(s) and a binder.

Turning now to FIG. 1, shown is a schematic cross-section of an intermediate in the manufacture of an abrasive article of an embodiment of the invention. In this embodiment, intermediate abrasive article 10 is shown with abrasive particles 100 provided substantially in voids, which voids are provided in metallic foil 110. Second component 130 is affixed to the remaining structure with binding layer 120. The binding layer can be, for example, an adhesive such as a pressure sensitive adhesive or a hot melt adhesive.

Figure 2:
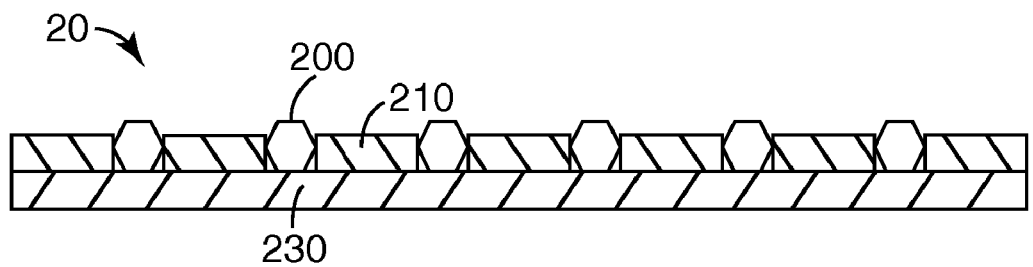
FIG. 2 is a schematic cross-section of another intermediate in the manufacture of an abrasive article of an embodiment of the invention.

FIG. 2 shows a schematic cross-section of another intermediate in the manufacture of an abrasive article of an embodiment of the invention. In this embodiment, abrasive article precursor 20 is shown with abrasive particles 200 provided substantially in voids, which voids are provided in metallic foil 210. Second component 230 is affixed to the remaining structure. This schematic cross-section is indicative of electro-deposited second component 230, and also of an embodiment such as shown in FIG. 1 with further processing at conditions that remove the binding layer shown in FIG. 1. For example, heat and/or pressure can be used to burn out or extrude an organic adhesive composition effectively altering the schematic cross-section of the embodiment shown in FIG. 1 into the schematic cross-section shown in FIG. 2.

Figure 3:
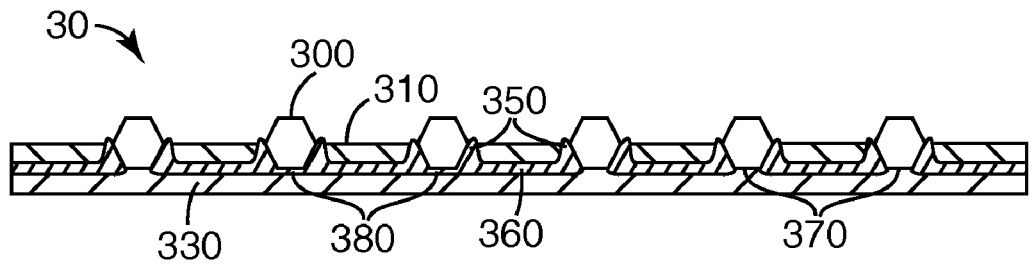
FIG. 3 is a schematic cross-section of an abrasive article of an embodiment of the invention.

FIG. 3 shows a schematic cross-section of an abrasive article of an embodiment of the invention. In this embodiment, abrasive article 30 is shown with abrasive particles 300 provided substantially in voids, which voids are provided in metallic foil 310. Second component 330 is affixed to the remaining structure. Alloy 350 is shown adjacent abrasive particles 300 as well as adjacent metallic foil 310 and second component 330. In some embodiments, abrasive particles 300 will be adjacent or substantially in contact with second component 330, with little or no alloy therebetween in contact regions 370. In some embodiments, alloy 380 will be present between abrasive particles 300 and second component 330. Of course, abrasive article combinations having alloy 380 and contact regions 370 are possible.

In some embodiments, the voids in the foil component are blind holes. In such embodiments, the second component is preferably supplied on the side of the foil which contains surface openings associated with the voids.

In some embodiments, the abrasive article includes a substrate which optionally may be bonded to the foil by an alloy formed between the foil and the second component at the time that the alloy is formed. In such embodiments, the substrate may contribute to the composition of the alloy, especially in the vicinity of the substrate. In other embodiments, a thicker second component also can serve as a substrate. In yet other embodiments, the substrate may be supplied in a separate operation and may be attached by any means known in the art such as, for example, solder adhesives, brazing, welding, and the use of mechanical fasteners. The substrate may be selected from a metal, an alloy, a polymer, a polystyrene, a polycarbonate, stainless steel, ceramic, or combinations thereof.

In some embodiments, the abrasive article may be provided with one of the known protective coatings, such as a diamond-like carbon coating. Such coatings can be provided via any known means, for example, physical vapor deposition, chemical vapor deposition, and electroplating. In other embodiments, the foil, which may occupy the majority of the exposed surface area of the abrasive article, may be sufficiently corrosion resistant to protect the entire article. In other embodiments, the foil may be selected to gradually erode under the conditions of use to continually expose fresh abrasive particles.

Although the description given may be read as providing an abrasive layer or layers which can be applied parallel to the surface of a workpiece, it should be appreciated that the layer or layers may be applied to the workpiece surface at any desired orientation.

This invention is useful in industrial abrasive articles, for example, in CMP pad conditioners, construction saw blades, grinding tools, drills, and the like.

Objects and advantages of this disclosure are further illustrated by the following examples, but the particular materials and amounts thereof recited in these examples, as well as other conditions and details, should not be construed to unduly limit this invention.

EXAMPLES

Example 1

An abrasive foil was prepared from a patterned mask 127 mm by 127 mm (5 inch square) of zirconium foil (0.002 inch/0.051 mm thick, with an annular region 96 mm (3.78 inch) O.D. by 58.4 mm (2.30 inch) I.D. containing a rectangular array of 0.25 mm (0.0098 inch) diameter holes on 3.63 mm (0.0143 inch) centers). An adhesive tape (number 7741, obtained from 3M, Saint Paul, Minn.), was applied to a first surface of the zirconium foil patterned mask to create a preform. Diamond particles (181 micron) which were subsequently coated with a 100 nm coating of Chrome Carbide then were sprinkled onto the second surface of the mask/tape assembly, whereby individual abrasive particles adhered to the adhesive exposed through the holes in the foil. Excess abrasive particles were removed. A 0.127 mm (0.005 inch) nickel shim was then placed next to the adhesive first surface of the preform and the composite was heated to 1020° C. under a pressure of 200 kg cm$^{-2}$ while subjected to a roughing vacuum of 760 mm Hg.

Example 2

An abrasive foil was prepared as in Example 1, except that the nickel shim was replaced by a solvent-cast nickel powder tape formed from a mixture of Nickel 123 powder from Inco, Toronto, Canada, with polyvinyl butyral, butyl benzyl phthalate plasticizer, and methyl ethyl ketone (MEK) coated by a knife coater having a 0.33 mm (13 mil) gap and dried.

Example 3

An abrasive foil was prepared and tested as in Example 2, except that the powder tape was replaced by a solvent cast powder tape formed from nickel/chrome powder, and BNi7 braze powder in a ratio of 4 parts by weight Ni/Cr to 1 part by weight BNi7, along with polyvinyl butyral, and MEK. Diamond particles (181 micron) were also used in this example. Upon cooling, the composite was trimmed, attached to a steel carrier plate, and tested by conditioning an IC 1000 (from Rohm and Haas Electronic Materials, Phoenix, Ariz.) pad mounted on a Strasbaugh operating at 85 rpm with 11.2 rpm oscillation, under a 3.17 kg (7 pound) conditioner force, and 18.6 kg (41 pound) down force on a 108 mm (4.25 inch) diameter copper slug. All three elements were co-rotating. Testing was in the presence of slurry (DA Nano CoppeReady 300, from DA Nanomaterials, Tempe, Ariz.) supplied at 75 mL min$^{-1}$. Pad thickness and metal slug removal rate were measured. Testing was interrupted at 15 minute intervals over the first hour and then every hour thereafter and the pad conditioner's cut rate against a standard substrate was measured. When the cut rate dropped below 20% of their initial value, the conditioner was deemed to have reached end of life as reported in Table I.

TABLE I

| Conditioner | Description | Result |
| --- | --- | --- |
| Competitor "A" | Braze | 4 hour life |
| Competitor "B" | Electroplated | 5 hour life |
| Example 3 | Zr:Nickel Chrome bond | 12+ hours |

Example 4

An abrasive foil was prepared as in Example 1, except that the nickel shim was replaced by a solvent-cast powder tape made of zirconium powder and Nickel 123 powder in a ratio of 3 parts by weight Zr to 1 part by weight Nickel 123, along with polyvinyl and MEK.

Example 5

A multilayered abrasive was prepared as in Example 1, except that the nickel shim was replaced with by a solvent cast powder tape formed from a mixture of BNi7 braze powder, polyvinyl butyral, and MEK coated using a knife coater having a 0.33 mm (13 mil) gap and dried. Alternating layers of the zirconium foil:diamond:adhesive tape (three layers) and the solvent cast powder tape (four layers) were then assembled and heated as in Example 1.

Example 6

An abrasive foil was prepared as in Example 1, except that the nickel shim was replaced by a solvent-cast Braze alloy powder tape formed from a mixture of BNi7 braze powder, polyvinyl butyral, and MEK was coated using a knife coater having a 0.33 mm (13 mil) gap and dried.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. An abrasive article comprising:
   (a) a metallic foil, a first component, having a first surface and a second surface and voids therein, wherein the metallic foil consists essentially of one of titanium and zirconium;

(b) a plurality of abrasive particles substantially in the voids of the metallic foil; and (c) an alloy at least partially between the abrasive particles and the metallic foil, wherein the alloy comprises a second component and a portion of the metallic foil near the abrasive particles and the metallic foil forms a majority of a contacting face of the abrasive article.

2. The abrasive article of claim 1 wherein the abrasive particles are superabrasive particles, optionally wherein the superabrasive particles are coated.

3. The abrasive article of claim 2 wherein the superabrasive particles are diamonds, optionally wherein the diamonds are natural diamonds.

4. The abrasive article of claim 1 wherein the metallic foil and the second component have a eutectic temperature below about 1000° C.

5. The abrasive article of claim 1 wherein the abrasive particles have a volume and wherein a plurality of the abrasive particles have at least about 5% of each of these abrasive particle's volume protruded above the top surface of the foil.

6. The abrasive article of claim 1 wherein the abrasive particles have a volume and wherein a plurality of the abrasive particles have at least about 15% of each of these abrasive particle's volume protruded above the top surface of the foil.

7. The article of claim 1 wherein the second component is selected from a metal or a metal alloy.

8. The article of claim 7 wherein the second component is a composition different from the metallic foil, and wherein the second component is selected from aluminum, cobalt, copper, nickel, titanium, zirconium, a braze alloy, or a combination thereof.

9. The abrasive article of claim 1 wherein the abrasive particles have a volume and wherein a plurality of the abrasive particles have at least about 85% of each abrasive particle's volume positioned between the first and second surfaces of the foil.

10. The abrasive article of claim 1 further comprising a protective layer on the first surface of the metallic foil.

11. The abrasive article of claim 1, wherein the second component forms eutectics with the metal foil.

12. A multilayer abrasive article comprising a first layer wherein the first layer comprises:

(a) a metallic foil, a first component, having a first surface and a second surface and voids therein, wherein the metallic foil consists essentially of one of titanium and zirconium;

(b) a plurality of abrasive particles substantially in the voids of the metallic foil; and (c) an alloy at least partially between the abrasive particles and the metallic foil, wherein the alloy comprises a second component and a portion of the metallic foil near the abrasive particles and the metallic foil forms a majority of a contacting face of the abrasive article.

13. The multilayer abrasive article of claim 12 further comprising a second layer wherein the second layer comprises:

(a) a metallic foil, a first component, having a first surface and a second surface and voids therein, wherein the metallic foil consists essentially of one of titanium and zirconium;

(b) a plurality of abrasive particles substantially in the voids of the metallic foil; and (c) an alloy at least partially between the abrasive particles and the metallic foil, wherein the alloy comprises a second component and a portion of the metallic foil near the abrasive particles and the metallic foil forms a majority of a contacting face of the abrasive article.

14. The multilayer abrasive article of claim 13 wherein a third abrasive layer is interposed between the first layer and the second layer.

15. The multilayer abrasive article of claim 14 wherein the third abrasive layer comprises:

(a) a metallic foil, a first component, having a first surface and a second surface and voids therein, wherein the metallic foil consists essentially of one of titanium and zirconium;

(b) a plurality of abrasive particles substantially in the voids of the metallic foil; and (c) an alloy at least partially between the abrasive particles and the metallic foil, wherein the alloy comprises a second component and a portion of the metallic foil near the abrasive particles and the metallic foil forms a majority of a contacting face of the abrasive article.

16. The multilayer abrasive article of claim 12 wherein the layered abrasive article is provided in discreet regions on a support.

17. The multilayer abrasive article of claim 16 wherein the discreet regions are on opposite faces of the support.

18. The multilayer abrasive article of claim 16 wherein the discreet regions are on opposite faces of a saw blade.

19. A method of making an abrasive article comprising:

(a) providing a metallic foil, a first component, having first and second surfaces and voids therein, wherein the metallic foil consists essentially of one of titanium and zirconium;

(b) providing an abrasive particle substantially in the voids of the metallic foil;

(c) providing a second component adjacent to the foil;

(d) heating at least the metallic foil and the second component to a temperature sufficient to provide an alloy of the metallic foil and the second component, and optionally (e) providing the abrasive article on a substrate.

20. The method of claim 19 wherein the substrate is selected from a metal, an alloy, a polymer, a polystyrene, a polycarbonate, stainless steel, ceramic, or combinations thereof, optionally wherein the substrate is suitable for a pad conditioner or saw segments.

* * * * *